United States Patent
Takeda et al.

(10) Patent No.: US 11,777,772 B2
(45) Date of Patent: Oct. 3, 2023

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/310,150

(22) PCT Filed: Jun. 14, 2017

(86) PCT No.: PCT/JP2017/021972
§ 371 (c)(1),
(2) Date: Dec. 14, 2018

(87) PCT Pub. No.: WO2017/217456
PCT Pub. Date: Dec. 21, 2017

(65) Prior Publication Data
US 2019/0190675 A1    Jun. 20, 2019

(30) Foreign Application Priority Data
Jun. 17, 2016  (JP) ................................ 2016-120932

(51) Int. Cl.
*H04L 27/26*  (2006.01)
*H04L 5/00*  (2006.01)
(Continued)

(52) U.S. Cl.
CPC ....... *H04L 27/2602* (2013.01); *H04B 7/2656* (2013.01); *H04L 5/0048* (2013.01);
(Continued)

(58) Field of Classification Search
None
See application file for complete search history.

(56) References Cited

U.S. PATENT DOCUMENTS

2012/0093064 A1\* 4/2012 Horiuchi ............... H04W 72/12
                                                      370/315
2012/0099553 A1\* 4/2012 Aiba ................. H04W 72/0413
                                                      370/329
(Continued)

FOREIGN PATENT DOCUMENTS

| EP | 3550920 A1 \* | 8/2015 |
| WO | 2013141770 A1 | 9/2013 |
| WO | 2016061382 A1 | 4/2016 |

OTHER PUBLICATIONS

Huawei, HiSilicon; "Discussion on frame structure for NR"; 3GPP TSG RAN WG1 Meeting #85 R1-164032; Nanjing, China, May 23-27, 2016 (8 pages).
(Continued)

*Primary Examiner* — Andre Tacdiran
(74) *Attorney, Agent, or Firm* — Osha Bergman Watanabe & Burton LLP

(57) ABSTRACT

The present invention is designed so that allocation of signals can be controlled appropriately even when multiple frame configurations are introduced. A control section that controls communication using a plurality of frame configurations that are applied to downlink data transmission, and a receiving section that receives a downlink reference signal are provided, and the receiving section performs reception, assuming that the downlink reference signal is allocated to a common time field and/or frequency field in the plurality of frame configurations. Furthermore, a control section that controls communication using a plurality of frame configurations that are applied to uplink data transmission, and a transmission section that transmits a measurement reference signal are provided, and the transmission section allocates the uplink reference signal to a common time field and/or frequency field in the plurality of frame configurations, and performs transmission.

7 Claims, 17 Drawing Sheets

(51) Int. Cl.
  *H04L 5/14* (2006.01)
  *H04B 7/26* (2006.01)
  *H04W 72/0446* (2023.01)

(52) U.S. Cl.
  CPC .......... *H04L 5/0051* (2013.01); *H04L 5/0062* (2013.01); *H04L 5/0082* (2013.01); *H04L 5/0092* (2013.01); *H04L 5/14* (2013.01); *H04L 5/1469* (2013.01); *H04W 72/0446* (2013.01); *H04L 5/0007* (2013.01)

(56) References Cited

U.S. PATENT DOCUMENTS

| | | |
|---|---|---|
| 2015/0043392 A1 | 2/2015 | Susitaival et al. |
| 2015/0085715 A1 | 3/2015 | Sun et al. |
| 2016/0112892 A1* | 4/2016 | Damnjanovic ... H04W 72/0446 370/336 |
| 2017/0332396 A1* | 11/2017 | Liao .................. H04L 27/26025 |
| 2018/0242296 A1* | 8/2018 | Li .......................... H04W 72/12 |
| 2019/0014576 A1* | 1/2019 | Liao ...................... H04L 1/1861 |
| 2019/0124688 A1* | 4/2019 | Golitschek Edler Von Elbwart ............ H04W 72/1268 |
| 2019/0132843 A1* | 5/2019 | Byun ................ H04W 72/0453 |
| 2019/0141737 A1* | 5/2019 | Kim .................. H04W 72/0446 |

OTHER PUBLICATIONS

Nokia, Alcatel-Lucent Shanghai Bell; "Basic frame structure principles for 5G"; 3GPP TSG-RAN WG1#85 R1-165027; Nanjing, P.R. China, May 23-27, 2016 (6 pages).

Extended European Search Report issued in the counterpart European Patent Application No. 17813351.8, dated May 28, 2019 (11 pages).

International Search Report issued in PCT/JP2017/021972, dated Aug. 29, 2017 (2 pages).

Written Opinion of the International Searching Authority issued in PCT/JP2017/021972, dated Aug. 29, 2017 (4 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

Office Action in counterpart European Patent Application No. 17 813 351.8 dated May 18, 2020 (6 pages).

Office Action issued in Chinese Application No. 201780037402.0; dated Sep. 29, 2022 (16 pages).

Office Action issued in counterpart Japanese Application No. 2018-523966 dated Sep. 21, 2021 (12 pages).

Office Action issued in European Application No. 17 813 351.8 dated Oct. 7, 2021 (7 pages).

\* cited by examiner

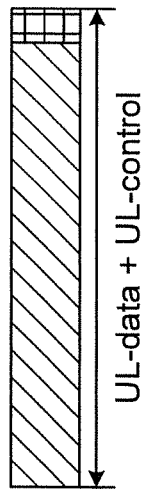
FIG. 1A
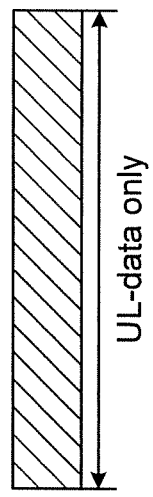
FIG. 1B
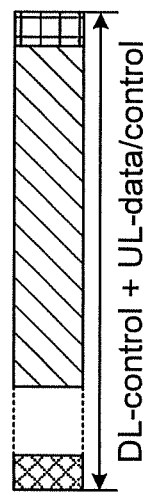
FIG. 1C
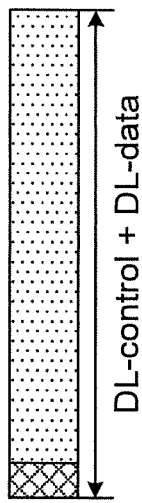
FIG. 1D
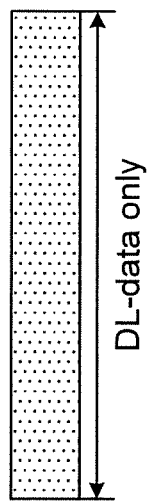
FIG. 1E
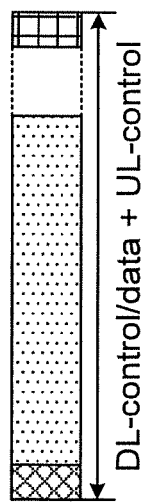
FIG. 1F
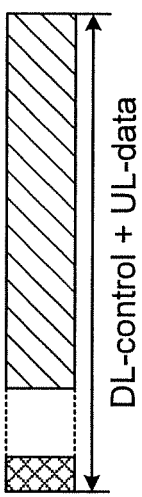
FIG. 1G
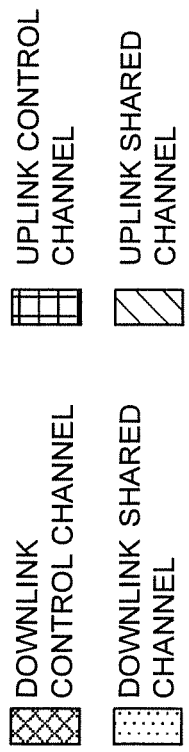

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, successor systems of LTE (referred to as, for example, "LTE-A (LTE-Advanced)," "FRA (Future Radio Access)," "5G (5th generation mobile communication system)," "NR (New-RAT (Radio Access Technology))"and so on) are also under study for the purpose of achieving further broadbandization and increased speed beyond LTE.

Existing LTE systems use control based on TDD (Time Division Duplex) and FDD (Frequency Division Duplex). For example, in TDD, whether to use each subframe in the uplink (UL) or in the downlink (DL) is strictly determined based on the UL/DL configuration.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In general, the traffic ratios of UL, DL and sidelinks (SLs) are not always constant, and vary in time or between locations. For this reason, radio communication systems that use TDD are expected to use radio resources efficiently, by dynamically changing the UL, DL and SL resource formats in a given cell (a transmission point, a radio base station, etc.) in accordance with the variation of traffic.

Now, for radio communication systems such as LTE Rel. 13 and later versions (for example, 5G/NR), radio frames (also referred to as "lean radio frames") to provide good future scalability and excellent power saving performance are under study. Unlike existing LTE systems, in which predetermined UL/DL configurations are used, regarding these radio frames, studies are in progress to make it possible to change the direction of communication such as UL and DL dynamically (this scheme is also referred to as "highly flexible dynamic TDD").

For example, it is conceivable that a part of the time period (for example, subframe or slot) is set as a subframe for DL communication, and the communication direction of the remaining subframes is dynamically changed. In 5 G/NR, it is also studied to introduce multiple frame configurations (also referred to as "frame configuration," "frame type," "channel configuration").

Meanwhile, when a plurality of frame configurations are introduced, the problem is how to control the allocation (mapping) of various signals and/or channels such as reference signals.

The present invention has been made in view of the above, and it is therefore an object of the present invention to provide a user terminal and a radio communication method that can appropriately control signal allocation even when a plurality of frame configurations are introduced.

Solution to Problem

According to one aspect of the present invention, a user terminal has a control section that controls communication using a plurality of frame configurations that are applied to downlink data transmission, and a receiving section that receives a downlink reference signal are provided, and, in this user terminal, the receiving section performs reception, assuming that the downlink reference signal is allocated to a common time-domain location and/or frequency-domain location in the plurality of frame configurations.

Advantageous Effects of Invention

According to the present invention, signal allocation can be appropriately controlled even when a plurality of frame configurations are introduced.

BRIEF DESCRIPTION OF DRAWINGS

FIGS. 1A to 1G are diagrams to show examples of frame configurations;

DESCRIPTION OF EMBODIMENTS

Figure 2:
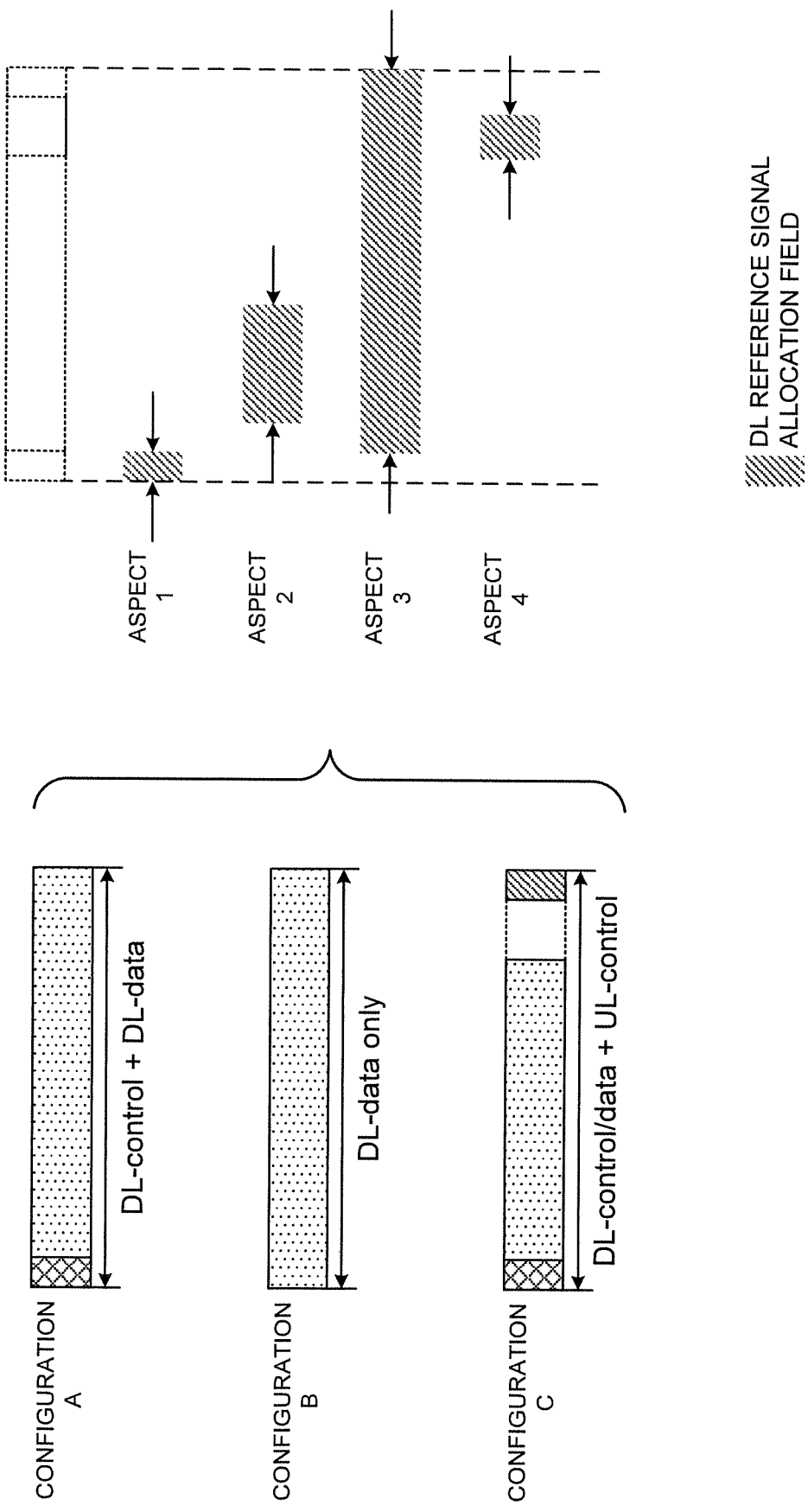
FIG. 2 is a diagram to explain the method of allocating DL reference signals.

As described above, envisaging future radio communication systems (5GR), studies are in progress to introduce a plurality of frame configurations (also referred to as "frame types," "channel configurations," "subframe configurations," "subframe types," "subframe configurations," "slot format (slot structures)," "slot types," "slot structures," etc.). FIG. 1 shows examples of frame configurations (here, temporal configurations) that can be used in 5G/NR. Note that the frame configurations shown in FIG. 1 are simply examples, and specific configurations, the number and so on frame configurations that can be applied to the present embodiment are not limited to the cases illustrated in FIG. 1. For example, only a part of the frame configuration shown in FIG. 1 may be used.

Note that frame configurations with different channel configurations may not be explicitly defined as different frame configurations. For example, it is also possible to define a plurality of combinations of channels and signals that are mapped to blocks of radio resources comprised of one or more symbols and one or more subcarriers, defined as common frame configurations. Hereinafter, for the sake of convenience, configurations that map different channels and signals to a block of radio resources comprised of predetermined consecutive symbols and subcarriers will be referred to as "different frame configurations."

Also, although examples are shown in which different channels are divided in the time domain, this by no means limits the frame configurations. For example, a downlink data channel and a downlink control channel do not necessarily have to be divided in time, and may be frequency-multiplexed/code-multiplexed in the same time period (for example, symbol). Also, an uplink data channel and an uplink control channel do not necessarily have to be divided in time, and may be frequency-multiplexed/code-multiplexed in the same time period (for example, symbol). The following description is based on, without losing generality, an example in which different channels are divided in the time domain as shown in FIG. 1.

Between the frame configurations shown in FIGS. 1A to 1C, the field (here, the time period) where a downlink data channel, which transmits downlink data, can be allocated varies. The downlink data channel may be referred to as a "downlink shared channel (PDSCH)." Between the frame configurations shown in FIGS. 1D to 1G, the field where an uplink data channel, which transmits uplink data, can be allocated varies. The uplink data channel may be referred to as an "uplink shared channel (PUSCH)."

When performing downlink data transmission, a radio base station and a user terminal can use one (part or all) of the radio frame configurations of FIGS. 1A to 1C, and, when performing uplink data transmission, the radio base station and the user terminal can use one of the radio frame configurations of FIGS. 1D-1G (partially or entirely). Alternatively, multiple frame configurations may be switched and applied.

FIG. 1A shows a frame configuration (or subframe configuration) in which a downlink control channel and a downlink shared channel are arranged. In this case, the user terminal controls receipt of downlink data and/or transmission of uplink data based on downlink control information that is transmitted in the downlink control channel (DCI).

FIG. 1B shows a frame configuration in which the downlink shared channel is arranged throughout the subframe (the downlink control channel is not arranged).

FIG. 1C shows a frame configuration in which a downlink control channel, a downlink shared channel and an uplink control channel are arranged. The user terminal controls receipt of downlink data and/or transmission of uplink data based on downlink control information that is transmitted in the downlink control channel. Furthermore, the user terminal may feed back delivery acknowledgment signals (HARQ-ACK), in response to data that is received in the downlink shared channel, in the uplink control channel in the same time period. Note that a gap period may be provided between the downlink shared channel and the uplink control channel. Although not shown, it is also possible to provide a gap period between the uplink control channel and the start time of the next frame or subframe.

Furthermore, assignment may be performed so that control of transmission/receipt (scheduling) is completed within a subframes, in order to enable short-time communication. This type of assignment is also referred to as "self-contained assignment." Subframes, in which self-contained assignment is performed, may be referred to as "self-containment subframes." Self-contained subframes may be referred to as "self-contained TTIs" or "self-contained symbol sets," or other names may be applied as well.

In self-contained subframes, a user terminal may receive a DL signal based on downlink control information, and also transmit a feedback signal (for example, an HARQ-ACK and/or the like) in response to that DL signal. The use of self-contained subframes can realize feedback with ultra-low delay of 1 ms or less, for example, so that the latency can be reduced.

FIG. 1D shows a frame configuration in which an uplink control channel and an uplink shared channel are arranged. In this case, the user terminal transmits uplink data in the uplink shared channel and transmits uplink control signals in the uplink control channel. FIG. 1E shows a frame configuration in which an uplink shared channel is arranged over subframes (uplink control channel is not allocated).

FIG. 1F shows a frame configuration in which a downlink control channel, an uplink shared channel, and an uplink control channel are arranged. Based on downlink control information that is transmitted in the downlink control channel, the user terminal can transmit UL signals (UL data, measurement report, etc.) in the same (or subsequent) subframe. Furthermore, assignment may be performed so that transmission/receipt control (scheduling) is completed within the same subframe, in order to enable short-time communication. FIG. 1G shows a frame configuration in which a downlink control channel and an uplink shared channel are arranged. Note that a gap period may be provided between the downlink control channel and the uplink shared channel. Although not shown, it is also possible to provide a gap period between the uplink control channel and the starting time of the next frame or subframe.

Furthermore, in frame configurations in which a plurality of channels are arranged, the order of arranging channels is not limited to the configurations shown in FIGS. 1. The location of each channel can be applied by interchanging as appropriate. In the following description, the radio frame configurations of FIGS. 1A to 1G are also referred to as configuration A to configuration G, respectively.

Now, future radio communication systems such as LTE Rel. 13 and later versions, 5G and others are expected to accommodate various services such as high-speed and large-capacity communication (eMBB (enhanced Mobile Broad Band)), massive access (mMTC (massive MTC)) from devices (user terminals) for inter-device communication (M2M (Machine-to-Machine)) such as IoT (Internet of Things) and MTC (Machine Type Communication), low-latency and high-reliability communication (URLLC (Ultra-Reliable and Low Latency Communication)), in a single framework.

Particularly, in URLLC and the like, reduction of communication latency (latency reduction) is required. In this case, it may be possible to apply a frame configuration that can reduce the delays of scheduling and/or HARQ processes, and/or to use shortened TTIs, where subframes (or TTI durations) are made shorter than 1 ms. For example, as shown in configuration C (FIG. 1C), configuration F (FIG. 1F) and configuration G (FIG. 1G), applying a configuration including downlink communication and uplink communication in a time period (subframe or slot) is effective for latency reduction.

Meanwhile, to improve the user's actual experienced speed, in addition to reducing scheduling and/or HARQ process delays, it is also necessary to perform appropriate and low-latency link adaptation. Link adaptation refers to adaptively controlling the modulation/coding scheme (MCS (modulation and coding scheme)), the number of MEMO layers and so on, depending on channel quality.

However, in order to properly perform link adaptation, it is necessary to appropriately recognize communication quality and control MCS and the number of layers. For that purpose, it is important that the radio base station and the user terminal appropriately perform the measurement and/or reporting operations using reference signals for the quality measurement.

For example, the user terminal receives a quality measurement reference signal (for example, also referred to as "CSI measurement RS," "CSI-RS," etc.) in the downlink, and reports the measurement result of this CSI measurement RS (CSI measurement information) to the radio base station in the uplink. The radio base station performs link adaptation (including, for example, determining the MCS and/or the number of layers, etc.) based on the measurement result reported from the user terminal. Alternatively, the radio base station performs link adaptation based on the received quality of the CSI measurement RS transmitted from the user terminal on the uplink. The radio base station reports the determined link adaptation information to the user terminal.

In this way, by using the measurement result of the RS for CSI measurement transmitted in the uplink or the downlink, it is possible to appropriately recognize channel quality and control link adaptation. Note that the RS for CSI measurement transmitted and received in the downlink may be referred to as "DL CSI-RS," "DL SRS," "RS for DL beam measurement (DL BRS)," "RS for DL beam adjustment (DL BRRS)," and so on. Also, the RS for CSI measurement transmitted and received in the uplink may be referred to as "UL CSI-RS," "UL SRS," "RS for measuring UL beam (UL BRS)," "RS for UL beam adjustment (UL BRRS)" and so on. In the following description, quality measurement reference signals that are transmitted in the downlink will be referred to as "DL reference signals," and quality measurement reference signals that are transmitted in the uplink will be referred to as "UL reference signals. Note that reference signals for channel estimation, which is necessary for demodulating data and control signals, may control transmission and receipt separately from the above DL reference signals and UL reference signals.

As described above, in future radio communication systems, it is assumed that a plurality of frame configurations will be introduced. However, although, at present, research is underway to introduce multiple frame configurations, how to allocate signals (or channels) such as reference signals in each frame configuration is not decided yet. From the perspective of allowing appropriate and low-latency link adaptation, an appropriate allocation method of DL reference signals and/or UL reference signals Gh in the case of applying a plurality of frame configurations is required.

The present inventors have focused on channels that are arranged in a plurality of frame configurations, and come up with the idea of configuring the allocation field (also referred to as "mapping field" or "arrangement field") for DL reference signals and/or UL reference signals based on the type of the channel. By assigning DL reference signals and/or UL reference signals to predetermined fields considering the types of channels arranged in each frame configuration and so on, reference signal can be properly transmitted and received.

One aspect of the present embodiment controls allocation of DL reference signals so that the field where DL reference signals can be allocated (allocation field) is common among a plurality of frame configurations. Also, allocation of UL reference signals is controlled so that the allocation field of UL reference signals is common among a plurality of frame configurations. Note that a common allocation field may be configured for a part of a plurality of frame configurations. A field where reference signals can be allocated refers to a predetermined time field (time period) and/or a frequency field where reference signals are allowed to be allocated.

In reference signal allocation fields, the radio base station and/or the user terminal can apply different mapping patterns between different user terminals and/or different antenna ports. Also, when configuring a common reference signal allocation field (or mapping pattern) for multiple frame configurations, in some of the frame configurations, allocation of reference signals to part of the allocation field may be restricted.

Alternatively, as another aspect of the present embodiment, assignment may be controlled so that DL reference signals and/or UL reference signals are arranged in different time and/or frequency fields (time-domain and/or frequency-domain locations) in each of a plurality of frame configurations. In this case, each frame configuration and the allocation field for reference signals may be defined in advance in association with each other, or the radio base station may report to the user terminal the field for allocating reference signals, for each frame configuration.

Now, embodiments of the present invention will be described below in detail with reference to the accompanying drawings. Note that the radio communication methods according to each embodiment may be applied individually or may be applied in combination.

Furthermore, subframes (TTIs) in the following embodiments may be subframes in existing LTE (1 ms), may be a period shorter than 1 ms (for example, 1 to 13 symbols), or may be a period longer than 1 ms. In addition, in the following description, the method of allocating (mapping) measurement reference signals will be described, but signals that can be applied to the present embodiment are not limited to measurement reference signals. Reference signals other than measurement reference signals, UL signals (UL channels), DL signals (DL channels) and others are equally applicable.

First Embodiment

With the first embodiment, a method of allocating a DL reference signal is described. FIG. 2 shows a case where a predetermined time period is configured for allocation of DL reference signals in a plurality of frame configurations (configuration A to configuration C) that are applied to downlink data transmission (aspect 1 to aspect 4). In FIG. 2, as a plurality of frame configurations, frame configurations (configuration A-configuration C), among which the allocation field (here, the time period) for a downlink shared channel is different, are shown as examples, but the frame configurations that can be applied are not limited to these. In addition, the frame configuration applied to the transmission of the downlink control channel may be applied.

(Aspect 1)

Figure 3:
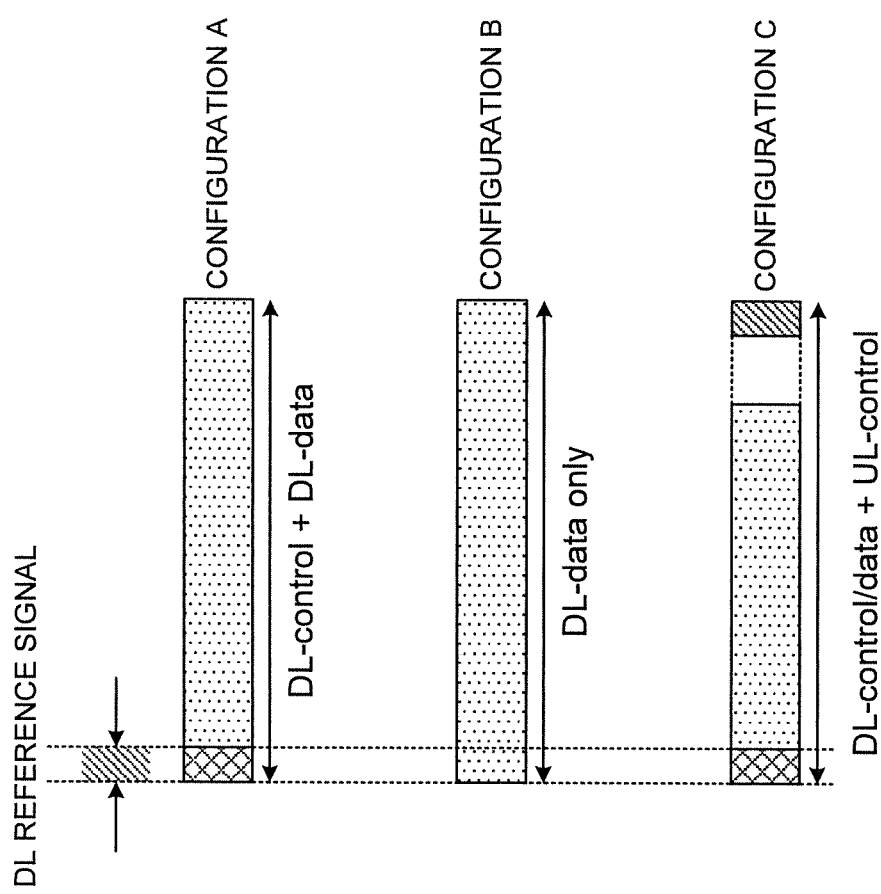
FIG. 3 is a diagram to show an example of the method of allocating DL reference signals.

FIG. 3 shows a case of configuring the allocation field for a DL reference signal in the same area as the allocation field for a downlink control channel of a predetermined frame configuration (configuration A and/or configuration C) in each frame configuration (configuration A to configuration C). The allocation field can be controlled, for example, on a per symbol basis. Furthermore, the allocation field for a DL reference signal is an area where a DL reference signals is allowed to be allocated, and the DL reference signals are transmitted (mapped) using at least part of the allocation field for a DL reference signal.

In frame configurations in which a downlink control channel is allocated in the allocation field for a DL reference signal (configuration A and configuration C), a downlink control channel and a DL reference signal can be allocated by frequency division multiplexing (FDM) and/or code division multiplexing (CDM). In a frame configuration in which no downlink control channel is allocated in the allocation field for a DL reference signal (configuration B), the downlink shared channel and the DL reference signal can be allocated by frequency division multiplexing and/or code division multiplexing. Note that, when frequency-division-multiplexing the downlink control channel or the downlink shared channel and the DL reference signal, the downlink control channel or the downlink shared channel can be rate matched or punctured by the resource element by not mapping to the resource element to which the DL reference signal is mapped.

In FIG. 3, a case is shown where the DL reference signal (downlink control channel) is allocated to the first field of the frame configuration (for example, the first one symbol or the first several symbols), but the present invention is not limited to this. In any of the frame configurations, the allocation field for a DL reference signal may be configured in the area where the downlink control channel is allocated.

The user terminal can acquire, in advance, configuration information of the DL reference signal transmitted periodically (or aperiodically), from the network (for example, radio base station) by higher layer signaling and/or physical layer signaling (for example, downlink control information). The configuration information of the DL reference signal includes at least one of information about the resource arrangement of the DL reference signal, information about the sequence/code of the DL reference signal, and antenna port information applied for transmission.

For example, the radio base station reports information about a predetermined mapping pattern and/or a mapping pattern corresponding to each antenna port as information about the resource arrangement of the DL reference signal to the user terminal. Alternatively, the radio base station may report sequence/code generation information of the DL reference signal and/or sequence/code generation information corresponding to each antenna port to the user terminal as information about the sequence/code of the DL reference signal. The radio base station can configure a common mapping pattern for multiple frame configurations to the user terminal. Note that a common mapping pattern may be configured for some frame configurations among a plurality of frame configurations.

In addition, a plurality of mapping patterns and/or sequences/codes of DL reference signals can be provided in the allocation field for a DL reference signal.

Note that the radio base station may report the allocation field for a DL reference signal to the user terminal, or report the mapping pattern to the user terminal without reporting the allocation field.

The user terminal receives the DL reference signal based on the configuration information of the DL reference signal reported from the radio base station and performs quality measurement (CSI measurement). For example, the user terminal controls receipt and measurement of the DL reference signal in each frame configuration based on the mapping pattern and so on reported from the radio base station. After measuring the DL reference signal, the user terminal feeds back CSI measurement information after a predetermined period of time or based on an explicit (explicit) instruction from the radio base station.

Alternatively, the user terminal may control receipt by determining the location where the DL reference signal is mapped and/or sequence/code generation information based on user terminal-specific information (for example, user ID) in the allocation field for a DL reference signal. That is, the mapping pattern of the DL reference signal and/or the sequence/code of the DL reference signal may be a function of user terminal specific information (for example, user ID).

In addition, when an uplink control channel is included in the time period in which the DL reference signal is transmitted, the user terminal can feed back CSI measurement information in the UL control channel included in the same time period as the DL reference signal (for example, configuration C). Alternatively, if the uplink shared channel is included in the time period in which the DL reference signal is transmitted, the user terminal can feed back CSI measurement information in the uplink shared channel included in the same time period as the DL reference signal.

Alternatively, the user terminal may feed back CSI measurement information using the UL control channel and/or the UL shared channel included in a predetermined time period after the time period where the DL reference signal is transmitted (for example, configuration A and configuration B).

As shown in FIG. 3, when arranging the DL reference signal in the first half part of the frame configuration or subframe (for example, the beginning part of a subframe or slot), the user terminal can receive the DL reference signal at an early timing and measure the frame. When applying a frame configuration that includes UL resources in the same time period as the DL reference signal (for example, configuration C), the time from the receipt of the DL reference signal to the uplink control channel can be made longer.

As a result, the user terminal can reserve time for calculating CSI measurement information, so that it becomes possible to feed back CSI measurement information quickly using the uplink control channel in the same time period. Also, by quickly feeding back CSI measurement information from the user terminal, the delay from the measurement of a DL reference signal to the measurement result report can be shortened, so that low latency link adaptation can be realized.

Furthermore, in a plurality of frame configurations, it is assumed that the allocation field for a downlink control channel is configured in the same location (for example, the first field of the subframe) (see configuration A, configuration C, configuration F and configuration G). In this case, by transmitting the DL reference signal using the allocation field for a downlink control channel in many subframe configurations, the possibility that DL reference signals interfere with UL signals of neighboring cells can be suppressed, so that accurate CSI measurement can be performed.

(Aspect 2)

Figure 4:
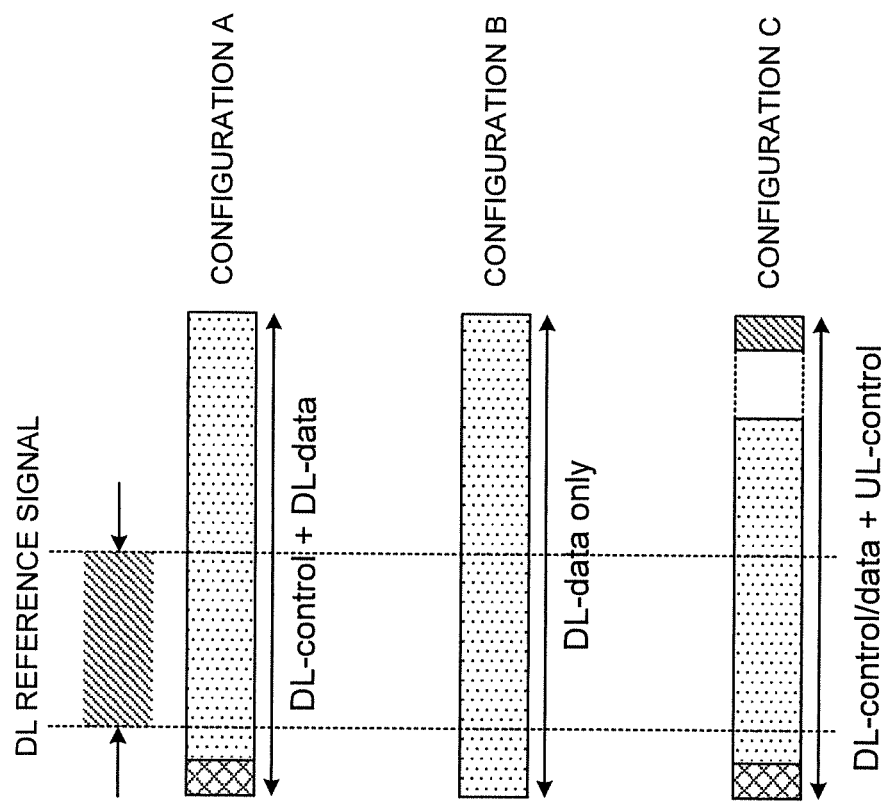
FIG. 4 is a diagram to show another example of the method of allocating DL reference signals.

FIG. 4 shows a case where the allocation field (for example, symbol) of the

DL reference signal is configured in the same area as the allocation field for a downlink shared channel in each frame configuration. In this case, in each frame configuration, the DL reference signal is allocated by frequency division multiplexing and/or code division multiplexing with the downlink shared channel.

In FIG. 4, there is shown a case where an allocation field for a DL reference signal is configured in part of the symbols in a field in which a downlink shared channel is arranged in a plurality of frame configurations, but this is by no means limiting. All the areas in which the downlink shared channel is configured in each frame configuration may be configured as the allocation field for a DL reference signal.

The user terminal can acquire configuration information of the DL reference signal from the radio base station with higher layer signaling and/or physical layer signaling. The configuration information of the DL reference signal and the like can be configured similarly to the aspect 1 above.

When the DL reference signal is placed in the first half of the frame configuration (for example, the first half part of the subframe), the user terminal can receive the DL reference signal at an early timing and perform the measurement. When applying a frame configuration that includes UL resources in the same time period as the DL reference signal (for example, configuration C), the time from the receipt of the DL reference signal to the uplink control channel can be made longer.

As a result, since the user terminal can reserve time for calculating CSI measurement information, it becomes possible to feed back CSI measurement information quickly using the uplink control channel in the same time period. Also, by quickly feeding back CSI measurement information from the user terminal, since the delay from the measurement of the DL reference signal to the measurement result report can be shortened, low latency link adaptation can be realized.

Furthermore, by placing the DL reference signal in the allocation field for a downlink shared channel in each frame configuration, it is possible to transmit the DL reference signal in symbols that serve as DL data in many DL subframe configurations. In this way, the possibility that the DL reference signal interferes with UL signals of neighboring cells can be suppressed. Also, by increasing the number of symbols for allocating DL reference signals, accurate CSI measurement can be realized.

(Aspect 3)

Figure 5:
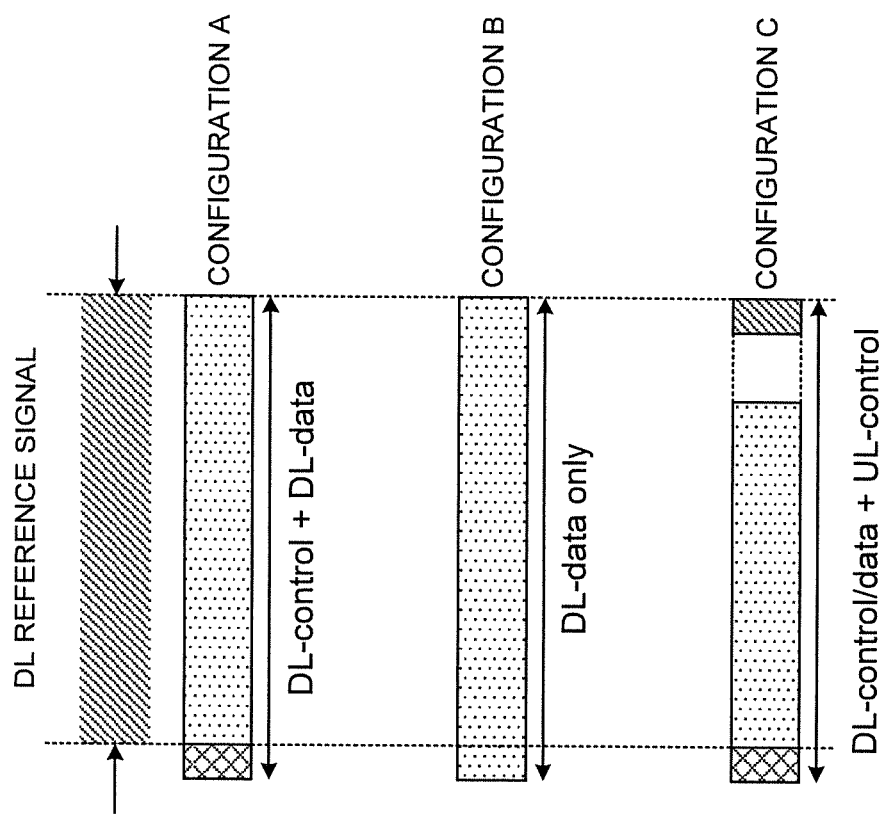
FIG. 5 is a diagram to show another example of the method of allocating DL reference signals.

FIG. 5 shows a case of configuring the allocation field for a DL reference signal even in an area in which the downlink shared channel is not arranged in a part of the frame configurations (for example, configuration C). That is, in part of the frame configurations, it is possible to assign the DL reference signal to the field in which the downlink shared channel is not arranged in other frame configurations (for example, configuration A and configuration B).

The user terminal can acquire configuration information of the DL reference signal from the radio base station with higher layer signaling and/or physical layer signaling. The configuration information of the DL reference signal and the like can be configured similarly to the aspect 1 above.

In each frame configuration, the radio base station exerts control so that the DL reference signal is mapped to the allocation field for a downlink shared channel and/or the downlink control channel. Meanwhile, the radio base station controls so as not to map the DL reference signal to the uplink control channel and/or the gap period in a predetermined frame configuration (for example, configuration C). In this case, the radio base station may control not to map the DL reference signal to the symbol after the allocation field for a downlink shared channel. When receiving a DL reference signal in a predetermined frame configuration (for example, configuration C), the user terminal performs receipt and measurement assuming that the DL reference signal is not mapped to the UL resource (for example, uplink control channel, uplink shared channel) and/or the gap period.

In this case, the radio base station may configure by modifying the mapping pattern of the DL reference signal according to the frame configuration (or subframe configuration). For example, the radio base station applies a different mapping pattern to the frame configuration not including the UL resource (for example, configuration A and configuration B) and the DL reference signal transmitted in the frame configuration (for example, configuration C) including the UL resource.

Alternatively, the radio base station may configure a common mapping pattern for each frame configuration in the user terminal. In this case, the radio base station controls so as not to map the DL reference signal in the field overlapping with the UL resource, and the user terminal assumes that the DL reference signal is not mapped to the field overlapping the UL resource and receives and/or measurements can be made. This allows one mapping pattern to be configured on the user terminal.

In FIG. 5, there is shown the case of configuring the allocation field for a DL reference signal in the area avoiding the allocation field for a downlink control channel of a predetermined frame configuration (configuration A, configuration C), but this is by no means limiting. It is also possible to configure the allocation field for a DL reference signal including the allocation field (for example, beginning of subframe) of the downlink control channel.

Furthermore, in the case shown in FIG. 5, it is possible to increase the allocation field for a DL reference signal (number of symbols that can transmit DL reference signal) as compared with FIG. 3 and FIG. 4, so that accurate CSI measurement can be realized.

(Aspect 4)

Figure 6:
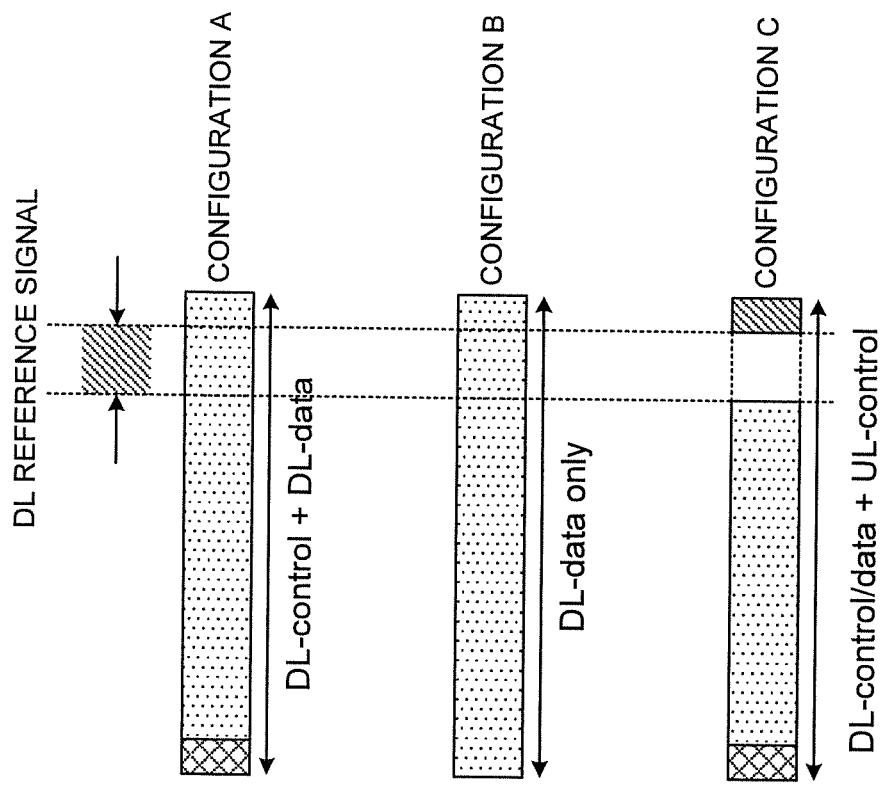
FIG. 6 is a diagram to show another example of the method of allocating DL reference signals.

FIG. 6 shows a case of configuring an allocation field for a DL reference signal in an area in which a downlink shared channel is not arranged in a part of the frame configuration (for example, configuration C). That is, in some frame configurations, the DL reference signal is transmitted in the area where the downlink shared channel is not allocated.

The user terminal can acquire configuration information of the DL reference signal from the radio base station with higher layer signaling and/or physical layer signaling. The configuration information of the DL reference signal and the like can be configured similarly to the aspect 1 above.

In FIG. 6, there is shown a case where the allocation field for a DL reference signal is configured to a time period as a gap period of a predetermined frame configuration (here, configuration C), but this is by no means limiting. The allocation field for a DL reference signal may be configured in an area to be a UL control channel of a predetermined frame configuration (for example, the last symbol of a subframe), or may be configured in an area to be a gap period and an uplink control channel.

By adopting a configuration in which the DL reference signal can be assigned to the last symbol of the subframe, the number of symbols transmitting the DL reference signal can be increased, so that accurate CSI measurement can be realized.

Alternatively, the radio base station may control not to map the DL reference signal to a plurality of symbols including the final symbol or the final symbol. As a result, it is possible to suppress the interference caused by the DL reference signal to the UL signal (for example, UL control channel) of the adjacent cell. Also, in the case of the configuration in which the next time period (subframe or frame configuration) begins with uplink transmission (for example, configuration D or configuration E), a gap period for switching between the DL communication and the UL communication can be provided between the radio base station and the user terminal after transmitting/receiving the DL reference signal.

Second Embodiment

Figure 7:
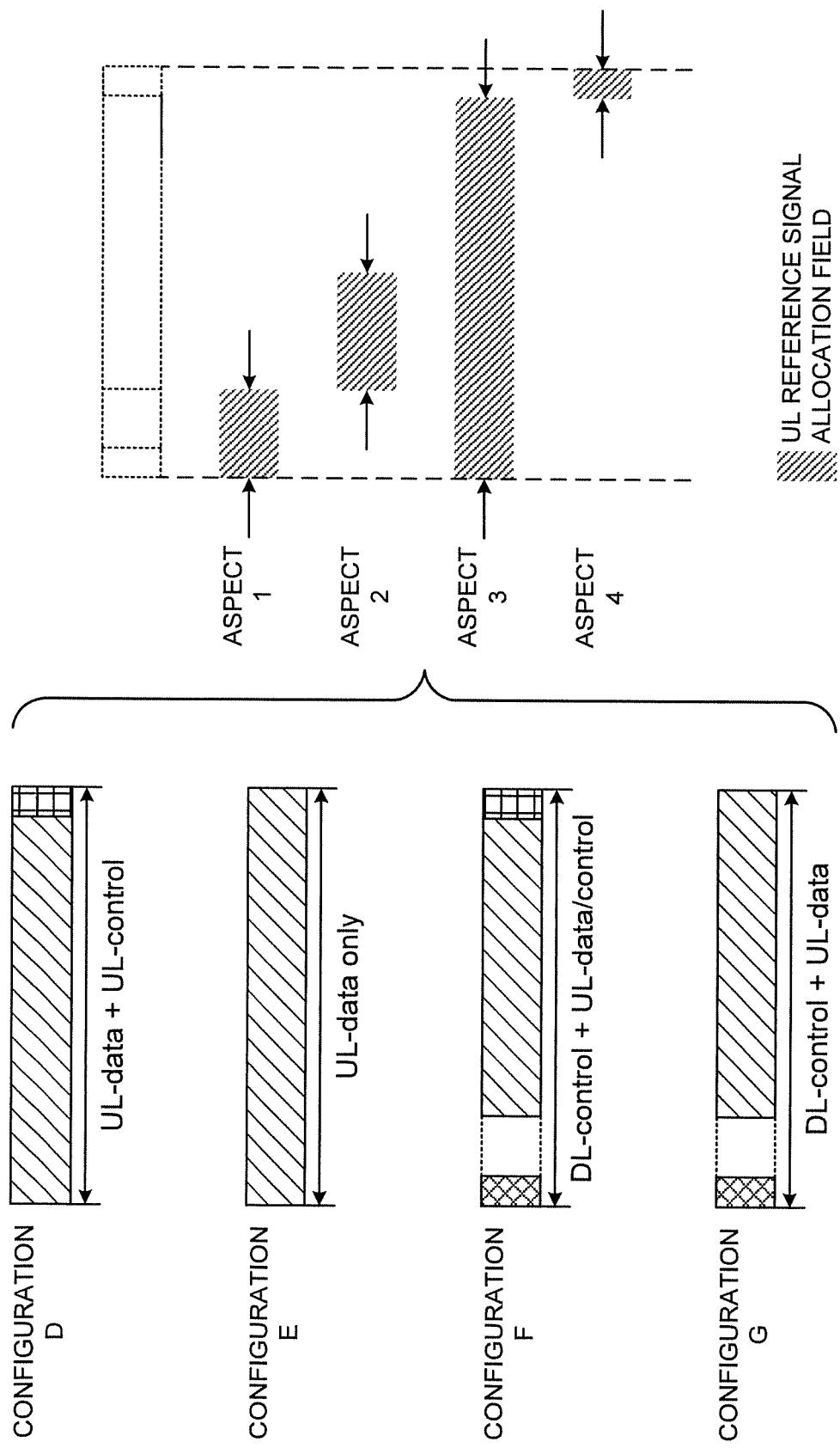
FIG. 7 is a diagram to explain the method of allocating UL reference signals.

In the second embodiment, a method of allocating UL reference signals is described. FIG. 7 shows a case of configuring the allocation of the UL reference signal in a predetermined time period in a plurality of frame configurations applied to the uplink data transmission (aspect 1 to aspect 4). Note that in FIG. 7, as a plurality of frame configurations, a frame configuration (configuration D to configuration G) in which the allocation field (here, the time period) of the uplink shared channel is different is cited as an example, the frame configuration that can be applied is not limited to this. The present invention may be applied to a frame configuration applied to transmission of an uplink control channel.

Figure 8:
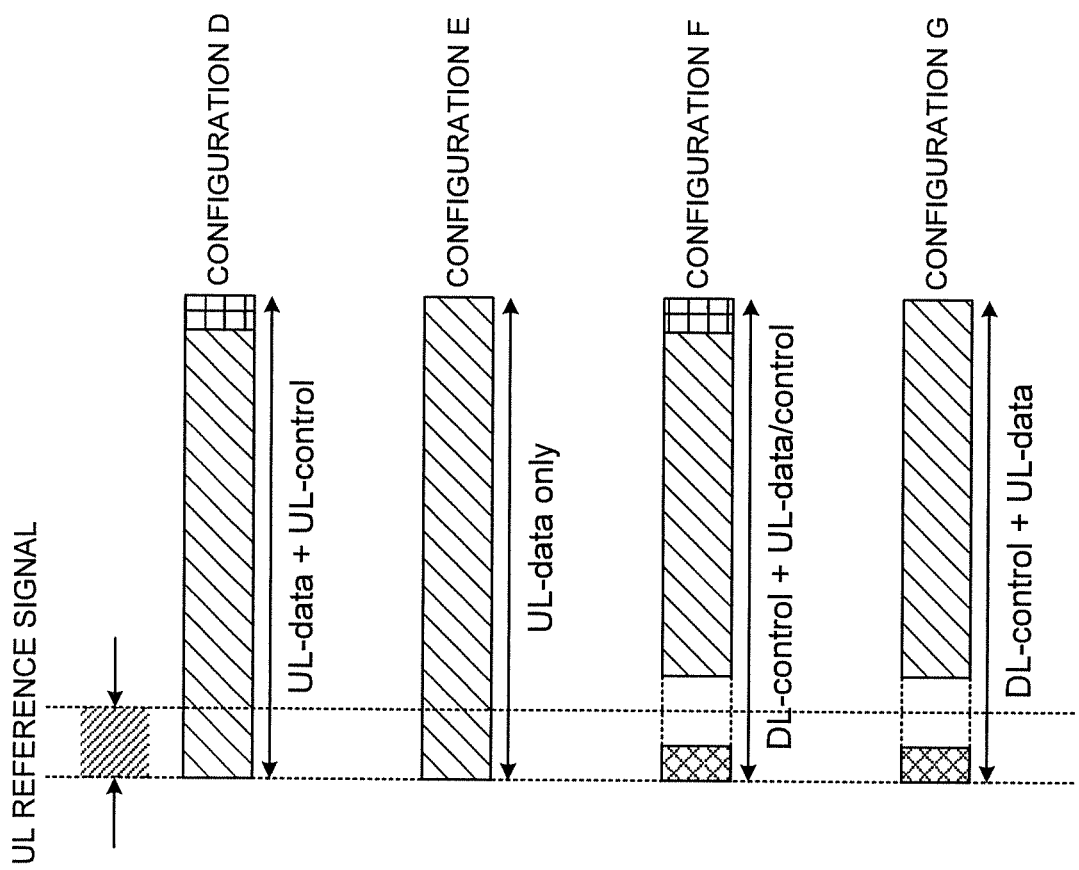
FIG. 8 is a diagram to show an example of the method of allocating UL reference signals.

(Aspect 1) FIG. 8 shows a case in which the allocation field of the UL reference signal is configured in a part of the first half of the subframe in each frame configuration (configuration D to configuration G). The allocation field can be controlled, for example, on a per symbol basis. In addition, the UL reference signal allocation field is an area to which the UL reference signal can be allocated, and the UL reference signal is transmitted (mapped) using at least a part of the allocation field of the UL reference signal.

Part of the symbols in the first half of the subframe can be symbols (one symbol or a plurality of symbols) including at least the symbols to which the downlink control channel is allocated in predetermined frame configurations (for example, configuration F and configuration G). Here, in the configurations F and G, a case where an area including a downlink control channel and a part of a gap period is used as an allocation field of a UL reference signal is shown, the allocation field of the UL reference signal may be configured in the area including all the gap periods.

When transmitting the UL reference signal in the allocation field for a downlink control channel (configuration F and configuration G), the user terminal may select whether to transmit the UL reference signal (skip receiving downlink control information) or to receive downlink control information (drop transmission of uplink reference signal), based on a predetermined condition such as a command from the base station. Furthermore, when transmitting the UL reference signal in the allocation field of the uplink shared channel (configuration D and configuration E), the user terminal can perform frequency division multiplexing and/or code-division-multiplexing and map an uplink shared channel and a UL reference signal. Note that, when frequency-division-multiplexing an uplink shared channel and a UL reference signal, the downlink shared channel is not mapped to the resource element to which the UL reference signal is mapped but rate matching or puncturing can be performed by the resource element.

The user terminal can acquire the configuration information of the UL reference signal that is transmitted periodically (or aperiodically) in advance from the radio base station with higher layer signaling and/or physical layer signaling (for example, downlink control information). The configuration information of the UL reference signal includes at least one of information about the transmission resource of the UL reference signal, information about the sequence/code of the UL reference signal, the antenna port information to apply to transmission, and information about the transmission power of the UL reference signal.

For example, the radio base station reports information about a predetermined mapping pattern and/or mapping pattern corresponding to each antenna port to the user terminal as information about the transmission resource of the UL reference signal. Alternatively, the radio base station may report sequence/code generation information about the UL reference signal and/or sequence/code generation information corresponding to each antenna port, to the user terminal, as information about the sequence/code of the UL reference signal. The radio base station can configure a common mapping pattern to a plurality of frame configurations to the user terminal. Note that a common mapping pattern may be configured for some frame configurations among a plurality of frame configurations.

Furthermore, a plurality of codes/sequences of the mapping pattern and/or the UL reference signal can be provided in the allocation field of the UL reference signal. Note that the radio base station may report the allocation field of the UL reference signal to the user terminal, or may be configured to report the mapping pattern to the user terminal without reporting the allocation field.

The user terminal controls transmission (mapping) of the UL reference signal based on the UL reference signal configuration information reported from the radio base station. For example, the user terminal controls transmission of the UL reference signal in each frame configuration based on the mapping pattern and so on reported from the radio base station. In addition, when a user terminal transmits a UL reference signal in a frame configuration (for example, configuration F and configuration G) including a DL resource, whether to transmit the UL reference signal (skip receiving downlink control information) or receive downlink control information (drop transmission of uplink reference signal) can be selected based on predetermined conditions such as a command from the base station.

Alternatively, the user terminal may control the mapping of the UL reference signal based on user terminal-specific information (for example, user ID) in the allocation field of the UL reference signal. That is, the mapping pattern of the UL reference signal and/or the sequence/code of the UL reference signal may be a function of user terminal-specific information (for example, user ID).

The user terminal may control transmission of the UL reference signal in response to a command (UL reference signal trigger) from the radio base station. In this case, the transmission instruction of the UL reference signal from the radio base station and the transmission of the UL reference signal by the user terminal can be configured to be performed in the same time period (subframe or slot). Alternatively, the user terminal may transmit the UL reference signal in a predetermined period of time after the time period in which the transmission instruction of the UL reference signal transmitted from the radio base station is received.

As shown in FIG. 8, when arranging the UL reference signal in the frame configuration or in the first half of the subframe (for example, the beginning of a subframe or slot), the radio base station can receive the UL reference signal at an early timing and measure it. In this case, the time from the receipt of the UL reference signal to the next (for example, in the following time period) downlink control channel to be transmitted can be increased.

As a result of this, the radio base station can reserve time to calculate the quality measurement result based on the UL reference signal, determine the MCS and the like, and report the MCS and so on to the user terminal using the next downlink control channel. As a result, the radio base station can shorten the delay from the measurement of the UL reference signal to link adaptation, and realize low delay link adaptation.

(Aspect 2)

Figure 9:
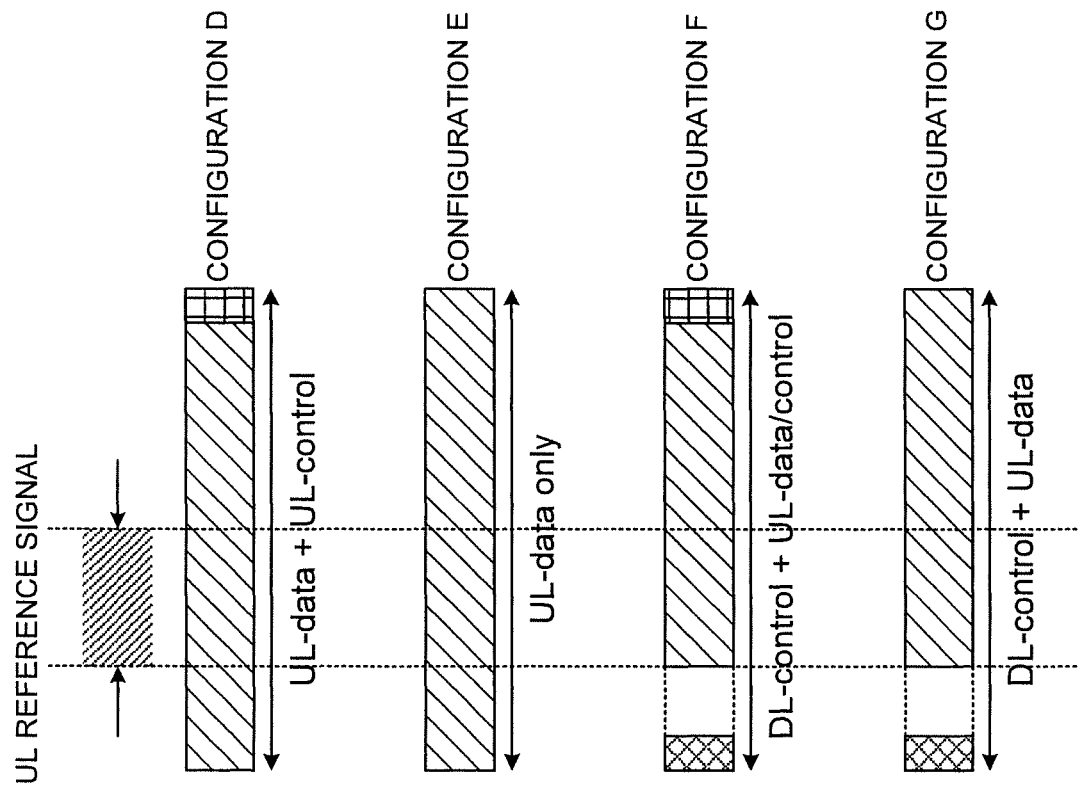
FIG. 9 is a diagram to show another example of the method of allocating UL reference signals.

FIG. 9 shows a case of configuring the allocation field (for example, symbols) of the UL reference signal in the same area as the allocation field of the uplink shared channel of each frame configuration. In this case, in each frame configuration, the user terminal can allocate the uplink shared channel and the UL reference signal by frequency division multiplexing and/or code-division-multiplexing.

FIG. 9 shows a case where the allocation field of the UL reference signal is configured in part of the symbols in the area where the uplink shared channel is arranged in a plurality of frame configurations, but this is by no means limiting. All areas where uplink shared channels are configured in each frame configuration may be configured as the allocation field of the UL reference signal.

The user terminal can obtain the configuration information of the UL reference signal from the radio base station with higher layer signaling and/or physical layer signaling. The configuration information of the UL reference signal and the like can be configured similarly to the aspect 1 above.

When the UL reference signal is arranged in the first half of the frame configuration (for example, the first half of the subframe), the radio base station can receive the UL reference signal at an early timing and measure the radio signal. In this case, the time from the receipt of the UL reference signal to the next (for example, in the following time period) downlink control channel to be transmitted can be increased.

In this way, the radio base station can reserve time to calculate the quality measurement result based on the UL reference signal, determine the MCS and the like and report the MCS and so on to the user terminal using the next downlink control channel. As a result, the radio base station can shorten the delay from the measurement of the UL reference signal to link adaptation and realize low delay link adaptation.

Furthermore, by arranging the UL reference signal in the allocation field of the uplink shared channel of each frame configuration, it is possible to transmit the UL reference signal with the symbol that becomes UL data in many UL subframe configurations. Thus, the possibility that the UL reference signal interferes with the DL signal of neighboring cells can be suppressed. Moreover, by configuring many allocation fields of the UL reference signal (the number of symbols that can be used for UL reference signal transmission), it is possible to realize accurate CSI measurement.

(Aspect 3)

Figure 10:
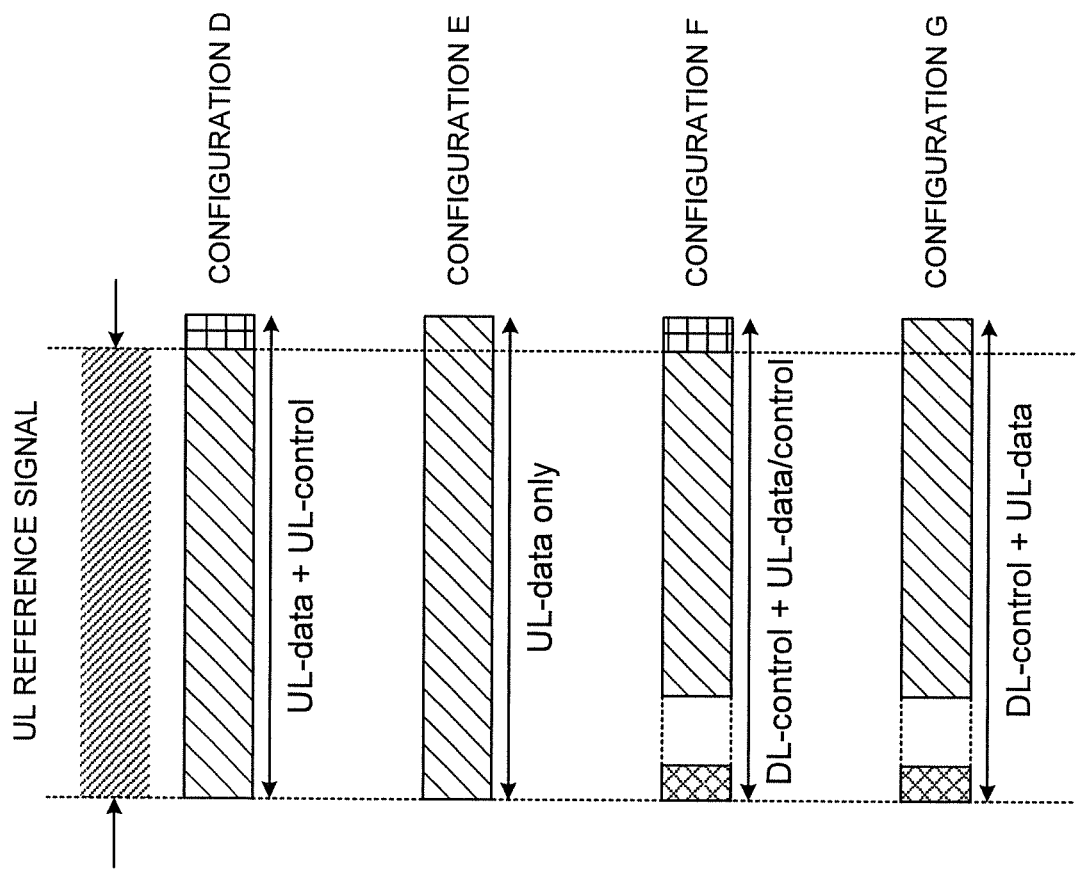
FIG. 10 is a diagram to show another example of the method of allocating UL reference signals.

FIG. 10 shows a case of configuring the allocation field of the UL reference signal even in an area in which the uplink shared channel is not arranged in a part of the frame configuration (for example, configuration F and configuration G). That is, in some frame configurations, even for an area where no downlink shared channel is allocated, in other frame configurations (for example, configuration D and configuration E), UL reference signals can be allocated to this area.

The user terminal can obtain the configuration information of the UL reference signal from the radio base station with higher layer signaling and/or physical layer signaling. The configuration information of the UL reference signal and the like can be configured similarly to the aspect 1 above.

The radio base station and the user terminal in each frame configuration perform control so that the UL reference signal is mapped to the allocation field of the uplink shared channel and/or the uplink control channel. Meanwhile, in the predetermined frame configuration (for example, configuration F and configuration G), the user terminal assumes that the receipt of the downlink control channel and the transmission of the UL reference signal do not occur in the same symbol. For example, the user terminal controls so as not to map the UL reference signal to a symbol (for example, symbols before the uplink shared channel or symbols used for DL communication) for which UL transmission is not configured.

In this case, the radio base station may configure the UL reference signal mapping pattern to the user terminal according to the frame configuration (or subframe configuration). For example, the user terminal applies a different mapping pattern to the UL reference signal to be transmitted in frame configurations (for example, configuration D and configuration E) not including DL resources and frame configurations (for example, configuration F and configuration G) including DL resources.

Alternatively, the radio base station may configure a common mapping pattern for each frame configuration in the user terminal. In this case, the user terminal controls so as not to map the UL reference signal in an area (section in which UL transmission is not performed) overlapping with the DL resource. Thus, it is possible to set one mapping pattern to be configured in the user terminal.

Note that FIG. 10 shows a case where the allocation field of the UL reference signal is configured in the area avoiding the allocation field of the uplink control channel of a predetermined frame configuration (configuration D and configuration F), but this is not limiting. The allocation field of the UL reference signal including the allocation field (for example, the last symbol of a subframe) of the uplink control channel may be configured.

In the case shown in FIG. 10, compared with FIG. 8 and FIG. 9, it is possible to increase the allocation field (the number of transmission symbols of the UL reference signal) of the UL reference signal, so that accurate CSI measurement can be realized.

(Aspect 4)

Figure 11:
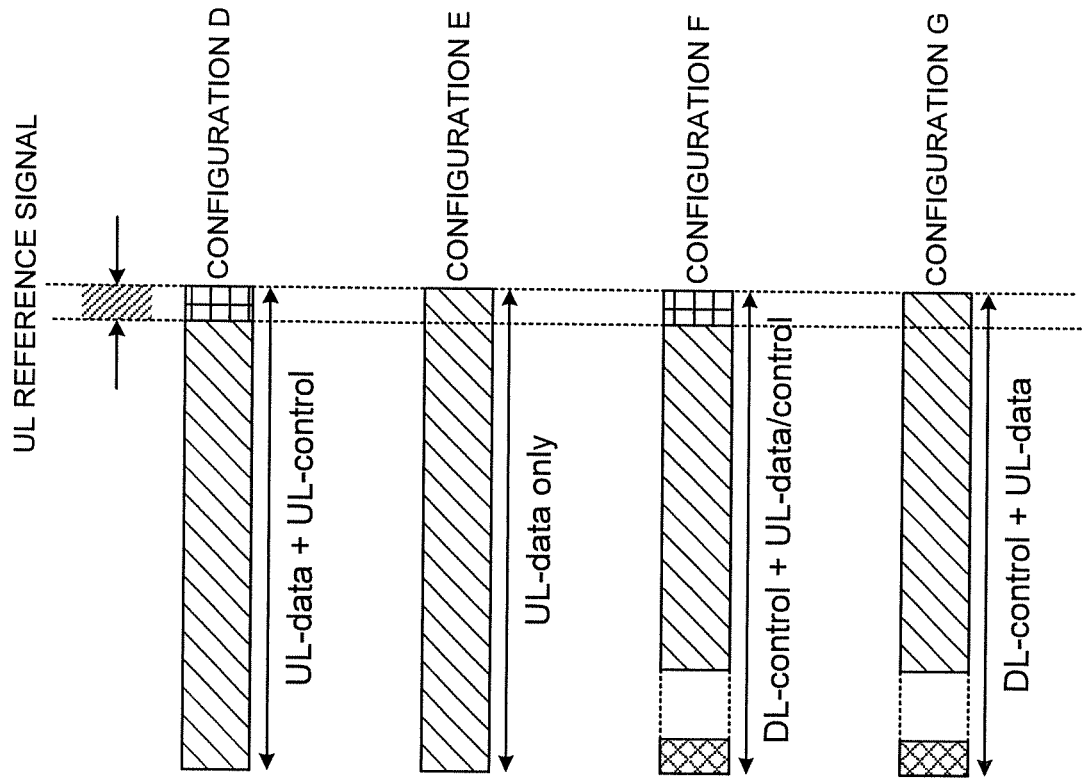
FIG. 11 is a diagram to show another example of the method of allocating UL reference signals.

FIG. 11 shows a case where the allocation field of the UL reference signal is configured in a partial area (for example, symbols) of the latter half of the subframe. For example, as shown in FIG. 11, the user terminal places the UL reference signal in the tail region (for example, the last one symbol or a plurality of symbols including the final symbol) of the subframe and transmits the UL reference signal.

In each frame configuration, the user terminal performs frequency division multiplexing and/or code-division-multiplexing on the signal placed in the final symbol and the UL reference signal and transmits the signal.

The user terminal can obtain the configuration information of the UL reference signal from the radio base station with higher layer signaling and/or physical layer signaling. The configuration information of the UL reference signal and the like can be configured similarly to the aspect 1 above.

In this way, by placing the UL reference signal in some symbols in the latter half of the subframe, it is possible to transmit the UL reference signal with symbols to be an uplink shared channel or an uplink control channel in many subframe configurations including a DL subframe. As a result, it is possible to suppress the possibility of the UL reference signal interfering with the DL signal of neighboring cells, and realize accurate CSI measurement.

(Radio Communication System)

Now, the structure of a radio communication system according to the present embodiment will be described below. In this radio communication system, each radio communication method according to the above-described embodiments is employed. Note that the radio communication method according to each embodiment may be used alone or may be used in combination.

Figure 12:
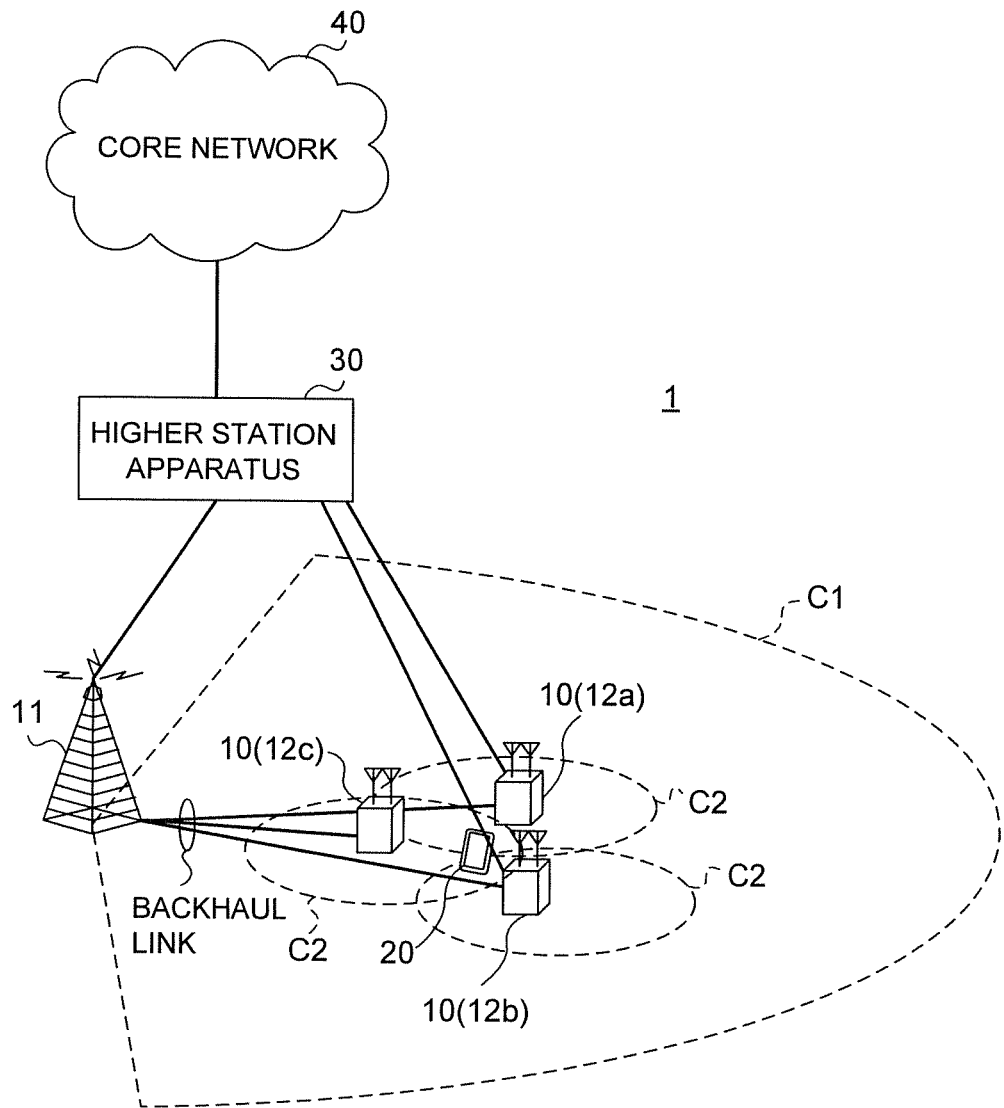
FIG. 12 is a diagram to show an example of a schematic structure of a radio communication system according to an embodiment of the present invention.

FIG. 12 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A" (LTE-Advanced), "IMT-Advanced," "4G," "5G," "FRA" (Future Radio Access), "NR" (New Rat) and so on.

The radio communication system 1 shown in FIG. 12 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A configuration in which different numerologies are applied between cells may be adopted. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells. Note that it is possible to adopt a configuration including a TDD carrier, in which shortened TTIs are applied to some of a plurality of cells.

Between the user terminals 20 and the radio base station 11, communication is carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (home eNodeBs), "RRHs" (Remote Radio Heads), "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

In the radio communication system 1, a DL data channel (PDSCH (Physical Downlink Shared CHannel), which is also referred to as "DL shared channel" and so on), which is used by each user terminal 20 on a shared basis, a broadcast channel (PBCH (Physical Broadcast CHannel)), L1/L2 control channels and so on are used as DL channels. User data, higher layer control information and SIBs (System Information Blocks) are communicated in the PDSCH. Also, the MIB (Master Information Blocks) is communicated in the PBCH.

The L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement information (ACK/NACK) in response to the PUSCH is communicated by the PHICH. The EPDCCH is frequency-division-multiplexed with the PDSCH (downlink shared data channel) and used to communicate DCI and so on, like the PDCCH.

In the radio communication system 1, a UL data channel (PUSCH (Physical Uplink Shared CHannel), which is also referred to as "UL shared channel" and so on), which is used by each user terminal 20 on a shared basis, a UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of delivery acknowledgment information (ACK/NACK) and radio quality information (CQI), is communicated via the PUSCH or the PUCCH. By means of the PRACH, random access preambles for establishing connections with cells are communicated.

(Radio Base Station)

Figure 13:
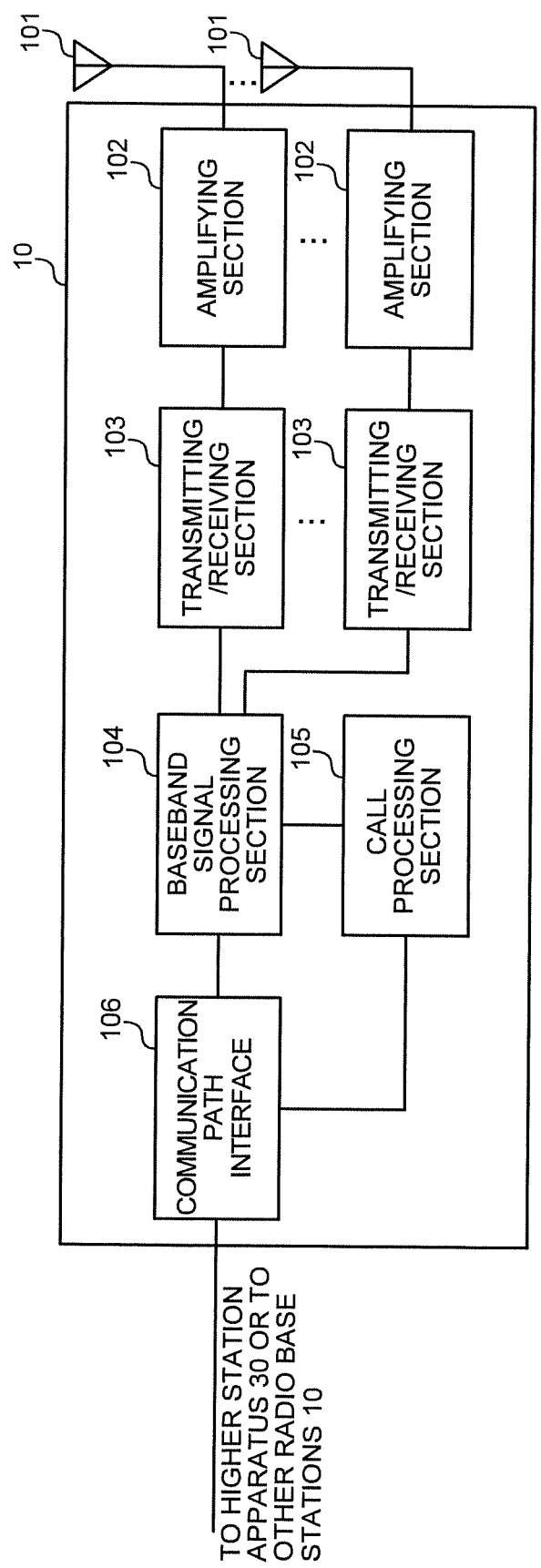
FIG. 13 is a diagram to show an example of an overall structure of a radio base station according to an embodiment of the present invention.

FIG. 13 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105, and a communication path interface 106. Note that one or more transmitting/receiving antennas 101, amplifying sections 102 and transmitting/receiving sections 103 may be provided.

DL data to be transmitted from the radio base station 10 to a user terminal 20 is input from the higher station apparatus 30 to the baseband signal processing section 104, via the communication path interface 106.

In the baseband signal processing section 104, the DL data is subjected to transmission processes, including a PDCP (Packet Data Convergence Protocol) layer process, division and coupling of user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, DL control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit DL signals (for example, a DL control signal (DL control channel), a DL data signal (DL data channel, DL shared channel and so on), a DL reference signal (DM-RS, CSI-RS and so on), a discovery signal, a synchronization signal, a broadcast signal and so on), and receive UL signals (for example, a UL control signal (UL control channel), a UL data signal (UL data channel, UL shared channel and so on), a UL reference signal and so on).

To be more specific, the transmitting/receiving sections 103 transmit DL reference signals in a common time field and/or frequency field (time-domain and/or frequency-domain locations) in multiple frame configurations (see FIG. 2 to FIG. 6). Also, the transmitting/receiving sections 103 transmit configuration information (for example, information about the mapping pattern) about a DL reference signal and/or a UL reference signal to be applied in common to a plurality of frame configurations. Also, the transmitting/receiving sections 103 perform receipt on the assumption that the UL reference signal is frequency division multiplexed and/or code-division-multiplexed with a predetermined signal in each frame configuration.

The transmission section and the receiving section of the present invention are comprised of a transmitting/receiving section 103 and/or a communication path interface 106.

Figure 14:
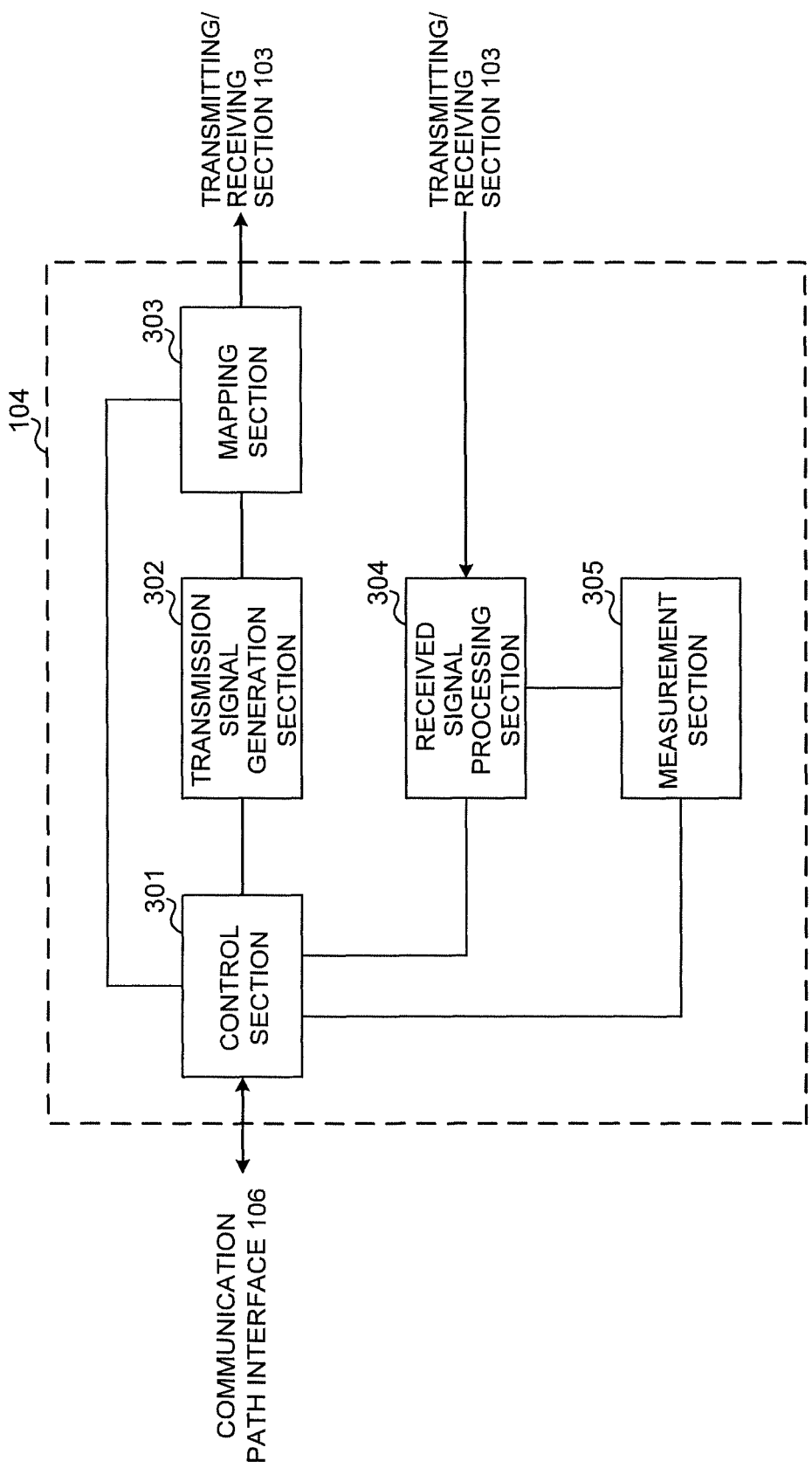
FIG. 14 is a diagram to show an example of a functional structure of a radio base station according to one embodiment of the present invention.

FIG. 14 is a diagram to show an example of a functional structure of a radio base station according to the present embodiment. Note that, although FIG. 14 primarily shows functional blocks that pertain to characteristic parts of the present embodiment, the radio base station 10 has other functional blocks that are necessary for radio communication as well. As shown in FIG. 14, the baseband signal processing section 104 at least has a control section 301, a transmission signal generation section 302, a mapping section 303, a received signal processing section 304 and a measurement section 305.

The control section 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of DL signals and/or UL signals. To be more specific, the control section 301 controls the transmission signal generation section 302, the mapping section 303 and the transmitting/receiving sections 103 to generate and transmit DCI (DL assignment) that includes DL data channel scheduling information and DCI (UL grant) that includes UL data channel scheduling information.

The transmission signal generation section 302 generates DL signals (DL control channel, DL data channel, DL reference signals, and so on) based on commands from the control section 301 and outputs the DL signals to the mapping section 303. The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. For example, mapping section 303 maps (using the same mapping pattern) a DL reference signals to a common time field (time-domain location) and/or frequency field (frequency-domain location) in multiple frame configurations. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, UL signals that are transmitted from the user terminals 20 (UL control channel, UL data channel, UL reference signals, and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, the received signal processing section 304 outputs at least one of a preamble, control information and UL data to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

Also, by using the received signals, the received signal processing section 304 may measure the received power (for example, RSRP (Reference Signal Received Power)), the received quality (for example, RSRQ (Reference Signal Received Quality)), channel states and so on. The measurement results may be output to the control section 301.

(User Terminal)

Figure 15:
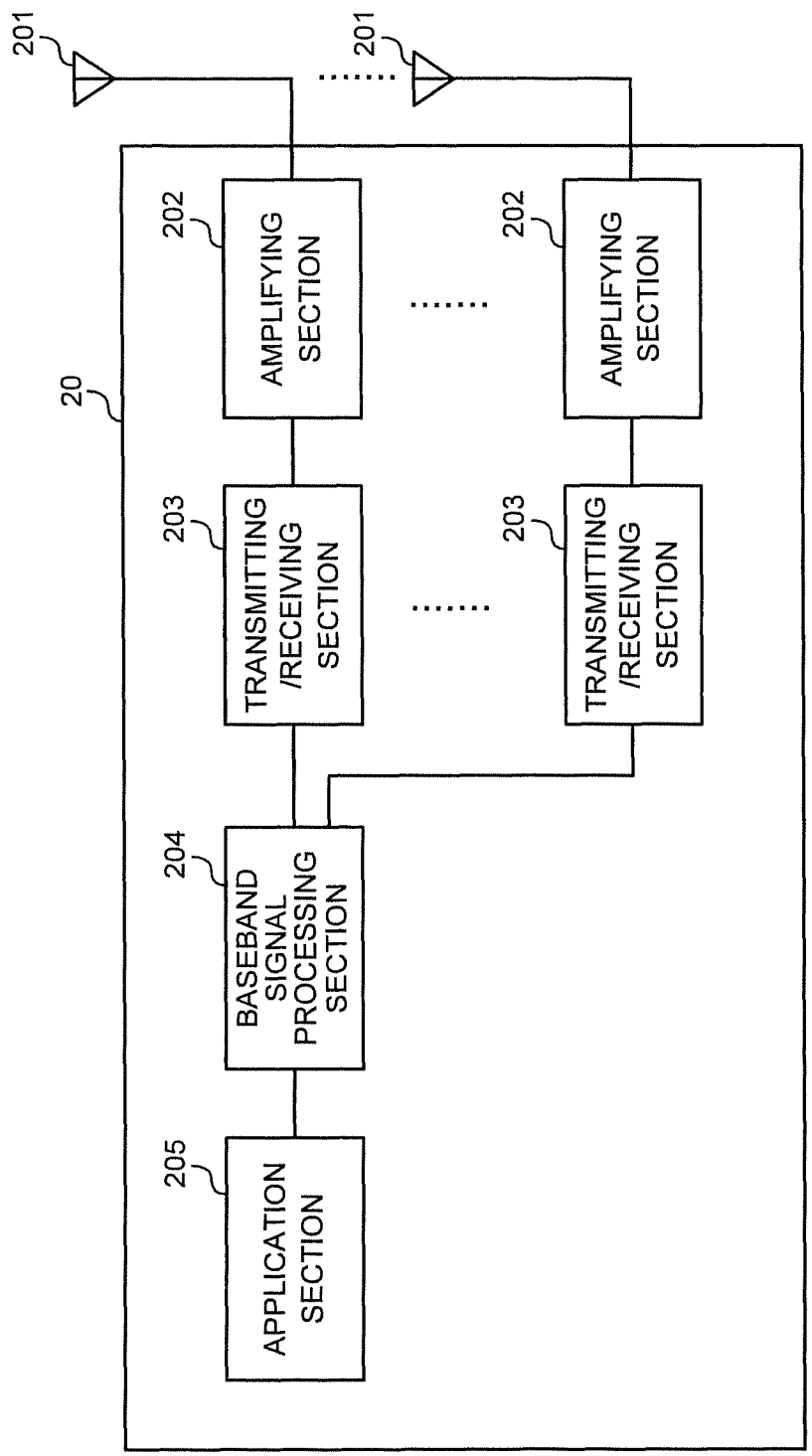
FIG. 15 is a diagram to show an example of an overall structure of a user terminal according to an embodiment of the present invention.

FIG. 15 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process and so on. The DL data is forwarded to the application section 205. The application section 205 performs processes related to higher layers above the physical layer and the MAC layer and so on. Also, in the DL data, the system information and the higher layer control information are also forwarded to the application section 205.

Meanwhile, the UL data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 transmit DL signals (for example, a DL control signal (DL control channel), a DL data signal (DL data channel, DL shared channel and so on), a DL reference signal (DM-RS, CSI-RS and so on), a discovery signal, a synchronization signal, a broadcast signal and so on), and receive UL signals (for example, a UL control signal (UL control channel), a UL data signal (UL data channel, UL shared channel and so on), a UL reference signal and so on).

To be more specific, the transmitting/receiving sections 203 transmit UL reference signals in a common time field and/or frequency field in multiple frame configurations (see FIG. 7 to FIG. 11). Also, the transmitting/receiving section 203 receives configuration information (for example, information about the mapping pattern) of a DL reference signal and/or a UL reference signal to be applied in common to a plurality of frame configurations. Also, the transmitting/receiving sections 203 perform receipt on the assumption that a DL reference signal is frequency division multiplexed and/or code-division-multiplexed with a predetermined signal in each frame configuration.

Figure 16:
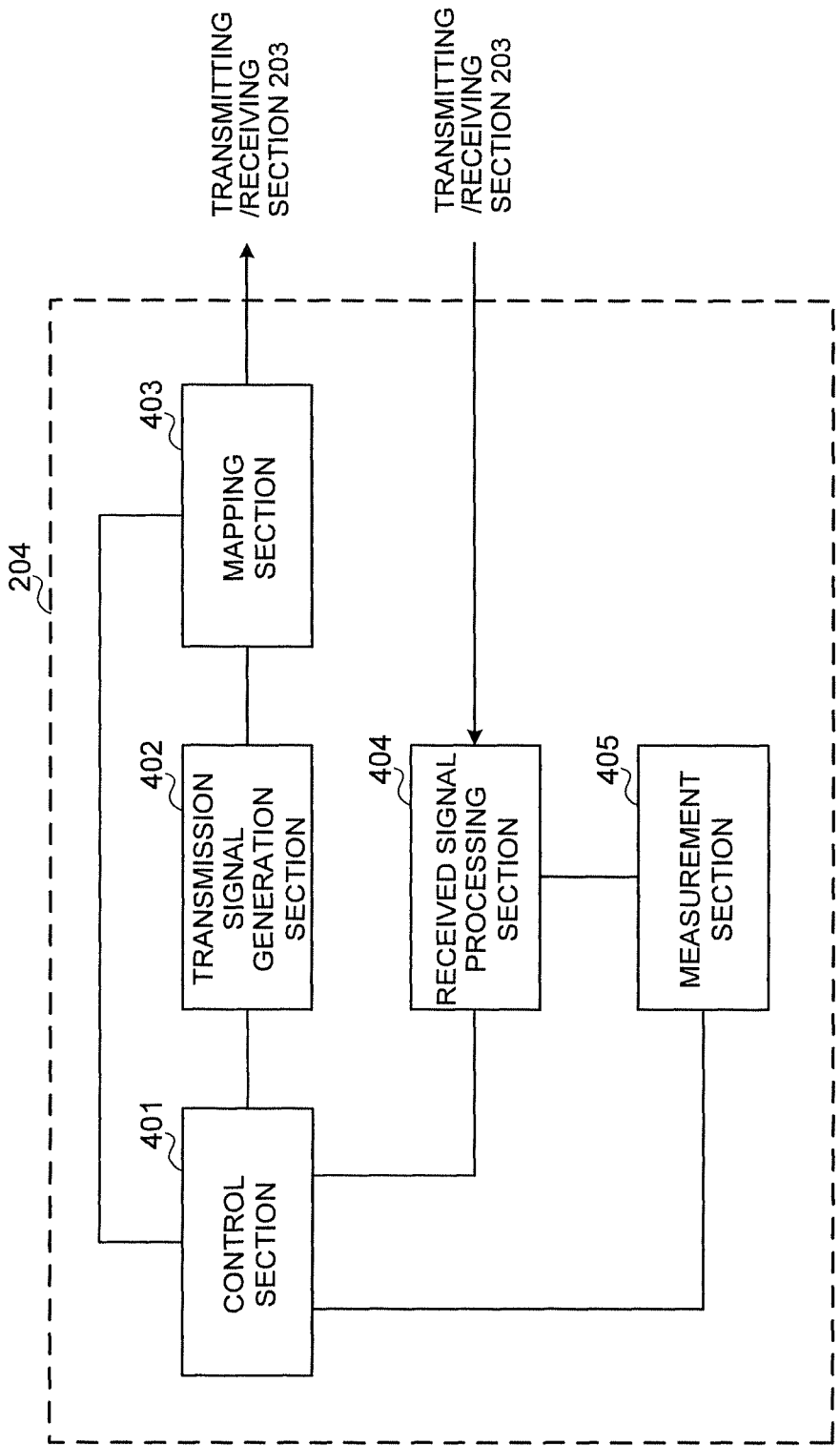
FIG. 16 is a diagram to show an example of a functional structure of a user terminal according to an embodiment of the present invention.

FIG. 16 is a diagram to show an example of a functional structure of a user terminal according to the present embodiment. Note that, although FIG. 16 primarily shows functional blocks that pertain to characteristic parts of the present embodiment, the user terminal 20 has other functional blocks that are necessary for radio communication as well. As shown in FIG. 16, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 controls communication using a plurality of frame configurations that are applied to DL transmission of downlink data and/or downlink control channels (where, for example, the allocation section of the downlink data channel varies). Also, the control section 401 controls receipt on the assumption that a DL reference signals is allocated to a common time field and/or frequency field in a plurality of frame configurations (see FIG. 2 to FIG. 6). Also, the control section 401 controls communication using a plurality of frame configurations that are applied to UL transmission of uplink data and/or uplink control channels (where, for example, the allocation section of the uplink data channel varies). Also, the control section 401 controls transmission by assigning a UL reference signal to a common time field and/or frequency field (time-domain and/or frequency-domain locations) in a plurality of frame configurations (see FIG. 7 to FIG. 11).

The transmission signal generation section 402 generates UL signals (UL control channel, UL data channel, UL reference signals and so on) based on commands from the control section 401, and outputs the UL signals to the mapping section 403. The transmission signal generation section 402 can be constituted by a signal generator, a signal generating circuit or signal generating apparatus that can be described based on general understanding of the technical field to which the present invention pertains.

Also, the transmission signal generation section 402 generates the UL data channel based on commands from the control section 401. For example, when a UL grant is included in a DL control channel that is reported from the radio base station 10, the control section 401 commands the transmission signal generation section 402 to generate the UL data channel.

The mapping section 403 maps the UL signals generated in the transmission signal generation section 402 to radio resources based on commands from the control section 401, and output the result to the transmitting/receiving sections 203. For example, mapping section 403 maps a UL reference signal to a common time field and/or frequency field in multiple frame configurations (that is, uses the same mapping pattern). The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signal include, for example, DL signals transmitted from the radio base station 10 (DL control channel, DL data channel, DL reference signals and so on). The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

Based on commands from control section 401, the received signal processing section 404 performs blind decoding of the DL control channel, which schedules transmission and/or reception of the DL data channel, and performs the receiving process of the DL data channel based on this DCI. In addition, the received signal processing section 404 estimates channel gain based on the DM-RS or the CRS, and demodulates the DL data channel based on the estimated channel gain.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of the data to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the DL received quality (for example, RSRQ), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 17:
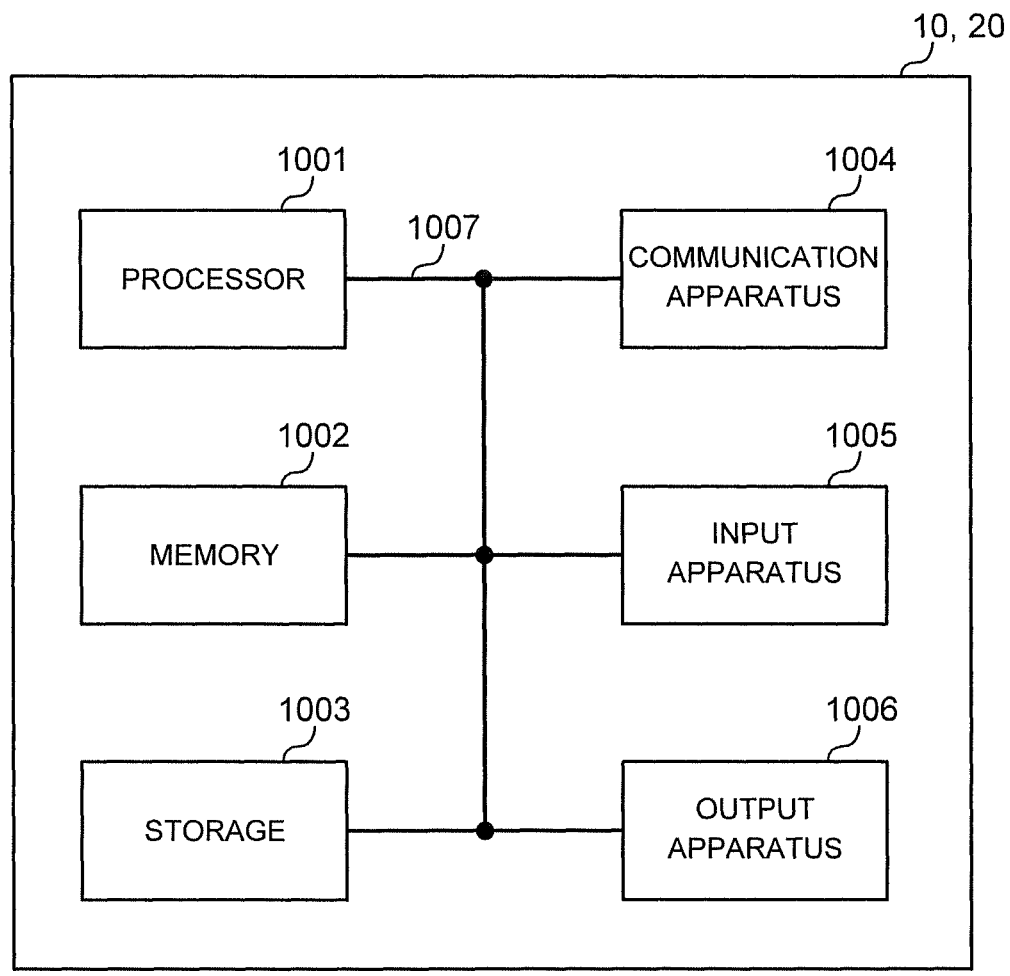
FIG. 17 is a diagram to show an example hardware structure of a radio base station and a user terminal according to an embodiment of the present invention.

That is, the radio base stations, user terminals and so according to the embodiments of the present invention may function as a computer that executes the processes of the radio communication method of the present invention. FIG. 17 is a diagram to show an example hardware structure of a radio base station and a user terminal according to an embodiment of the present invention. Physically, a radio base station 10 and a user terminal 20, which have been described, may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) or the like. The memory 1002 can store executable programs (program codes), software modules, and the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD (Frequency Division Duplex)) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols (OFDM (Orthogonal Frequency Division Multiplexing) symbols, SC-FDMA (Single Carrier Frequency Division Multiple Access) symbols, and so on) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval" (TTI), or a plurality of consecutive subframes may be referred to as a "TTI," or one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TT's is not limited to this. The TTI may be the transmission time unit of channel-encoded data packets (transport blocks), or may be the unit of processing in scheduling, link adaptation and so on.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block" (PRB (Physical RB)), a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, symbols and the like described above are merely examples. For example, configurations pertaining to the number of subframes included in a radio frame, the number of slots included in a subframe, the number of symbols and RBs included in a slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Information, signals and so on can be output from higher layers to lower layers and/or from lower layers to higher layers. Information, signals and so on may be input and output via a plurality of network nodes.

The information, signals and so on that are input and/or output may be stored in a specific place (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and signals and/or combinations of these.

Physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network consisting of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-120932, filed on Jun. 17, 2016, including the specification, drawings and abstract, is incorporated herein by reference in its entirety.

The invention claimed is:

1. A terminal comprising:
a processor that controls communication with a base station using a plurality of slot formats; and
a receiver that receives, from the base station, a downlink (DL) reference signal that is allocated to a given time-domain location based on information regarding mapping, provided by higher layer signaling,
wherein, in response to a use of a predetermined slot format of the plurality of slot formats, the plurality of slot formats being configured to have different transmission directions in units of a given number of symbols, the processor:
determines that the DL reference signal, which is allocated to the given time-domain location corresponding to a symbol that is an uplink (UL) resource in the predetermined slot format, is not allocated to the symbol, and
controls the receiver to receive the DL reference signal,
wherein in response to a use of a slot format different from the predetermined slot format, the processor determines that the DL reference signal is allocated to a symbol, that is a DL resource, in which the slot format does not include any UL resources, and
wherein time-domain locations supporting allocation of the DL reference signal, including the given time-domain location in which the DL reference signal is allocated, are defined in common for the plurality of slot formats.

2. The terminal according to claim 1, wherein the given time-domain location is configured in common for the plurality of slot formats.

3. A terminal comprising:
a processor that controls communication, with a base station, using a plurality of slot formats; and
a transmitter that transmits, to the base station, an uplink (UL) reference signal by using a given time-domain location based on information regarding mapping, provided by higher layer signaling,
wherein, in response to a use of a predetermined slot format of the plurality of slot formats, the plurality of slot formats being configured to have different transmission directions in units of a given number of symbols, the processor:
controls not to allocate the UL reference signal, which uses the given time-domain location corresponding to a symbol that is a DL resource in the predetermined slot format, to the symbol, and
controls the transmitter to transmit the UL reference signal,
wherein in response to a use of a slot format different from the predetermined slot format, the processor controls to allocate the UL reference signal to a symbol, that is a UL resource, in which the slot format does not include any DL resources, and
wherein time-domain locations supporting allocation of the UL reference signal, including the given time-domain location used to transmit the UL reference signal, are defined in common for the plurality of slot formats.

4. The terminal according to claim 3, wherein the given time-domain location is configured in common for the plurality of slot formats.

5. A radio communication method in a terminal, comprising:
controlling communication with a base station by using a plurality of slot formats; and
receiving, from the base station, a downlink (DL) reference signal that is allocated to a given time-domain location based on information regarding mapping, provided by higher layer signaling,
wherein, in response to a use of a predetermined slot format of the plurality of slot formats, the plurality of slot formats being configured to have different transmission directions in units of a given number of symbols, the terminal:
determines that the DL reference signal, which is allocated to the given time-domain location corresponding to a symbol that is an uplink (UL) resource in the predetermined slot format, is not allocated to the symbol, and
controls the receiving to receive the DL reference signal,
wherein in response to a use of a slot format different from the predetermined slot format, the terminal determines that the DL reference signal is allocated to a symbol, that is a DL resource, in which the slot format does not include any UL resources, and
wherein time-domain locations supporting allocation of the DL reference signal, including the given time-domain location in which the DL reference signal is allocated, are defined in common for the plurality of slot formats.

6. A base station comprising:
a transmitter that provides, by higher layer signaling, information regarding mapping of a downlink (DL) reference signal which is allocated to a given time-domain location; and
a processor that performs a control to allocate the DL reference signal by using a predetermined slot format of a plurality of slot formats, the plurality of slot formats being configured to have different transmission directions in units of a given number of symbols,
wherein the processor controls not to allocate the DL reference signal to a symbol that is an uplink (UL) resource in the predetermined slot format,
wherein in response to a use of a slot format different from the predetermined slot format, the processor controls to allocate the DL reference signal to a symbol, that is a DL resource, in which the slot format does not include any UL resources, and controls to transmit the DL reference signal, and
wherein time-domain locations supporting allocation of the DL reference signal, including the given time-domain location in which the DL reference signal is allocated, are defined in common for the plurality of slot formats.

7. A system comprising a base station and a terminal, wherein:

the base station comprises:

a transmitter that provides, by higher layer signaling, information regarding mapping of a downlink (DL) reference signal which is allocated to a given time-domain location; and a first processor that performs a control to allocate the DL reference signal by using a predetermined slot format of a plurality of slot formats, the plurality of slot formats being configured to have different transmission directions in units of a given number of symbols, wherein the first processor controls not to allocate the DL reference signal to a symbol that is an uplink (UL) resource in the predetermined slot format, and wherein in response to a use of a slot format different from the predetermined slot format, the first processor controls to allocate the DL reference signal to a symbol, that is a DL resource, in which the slot format does not include any UL resources, and controls to transmit the DL reference signal, and the terminal comprises:

a second processor that controls communication with the base station using the plurality of slot formats; and a receiver that receives the DL reference signal based on the information, wherein, in response to a use of the predetermined slot format of the plurality of formats, the second processor:

determines that the DL reference signal, which is allocated to the given time-domain location corresponding to the symbol that is the UL resource in the predetermined slot format, is not allocated to the symbol, and controls the receiver to receive the DL reference signal, wherein in response to the use of the slot format different from the predetermined slot format, the second processor determines that the DL reference signal is allocated to the symbol, that is the DL resource, in which the slot format does not include any UL resources, and wherein time-domain locations supporting allocation of the DL reference signal, including the given time-domain location in which the DL reference signal is allocated, are defined in common for the plurality of slot formats.

* * * * *